United States Patent [19]

Harms

[11] Patent Number: 4,655,940

[45] Date of Patent: Apr. 7, 1987

[54] CENTRAL COOLANT SYSTEM WITH INTERMITTENT WASTE FLUSHING

[75] Inventor: Eugene H. Harms, Perrysburg, Ohio

[73] Assignee: Henry Filters, Inc., Bowling Green, Ohio

[21] Appl. No.: 828,787

[22] Filed: Feb. 13, 1986

[51] Int. Cl.⁴ .................... F01M 1/10; F01M 11/02
[52] U.S. Cl. .................................... 210/805; 210/138;
210/167; 210/168; 210/416.5; 184/7.4
[58] Field of Search .............. 210/767, 790, 805, 138,
210/168, 171, 416.5, 167; 184/6.14, 6.21, 6.24,
7.4; 51/266, 356

[56] References Cited

U.S. PATENT DOCUMENTS

| | | | |
|---|---|---|---|
| 2,595,559 | 5/1952 | Alvord | 210/167 |
| 2,652,737 | 9/1953 | Longstreet | 51/266 |
| 3,618,707 | 11/1971 | Sluhan | 184/6.14 |

FOREIGN PATENT DOCUMENTS 121062  4/1918  United Kingdom .

Primary Examiner—Richard V. Fisher
Assistant Examiner—Linda S. Evans
Attorney, Agent, or Firm—H. P. Settle

[57] ABSTRACT

This invention relates to a central coolant system utilized to circulate filtered soluble oil coolant to a plurality of machining stations to flush machining waste from the stations. According to the invention, only the coolant required at the stations is continuously circulated in the system, and the machining waste is allowed to accumulate in the return flumes. This waste is periodically flushed, e.g., for 2–10 minutes every 2 hours or so, by additional coolant injected into the flumes. The flumes can be intermittently flushed by injecting a relatively small additional volume of additional coolant into individual collection flumes in series or by injecting a larger volume of coolant into all of the flumes simultaneously, both for a limited period of time. Substantial savings in pumping energy and overall coolant system size can be obtained.

9 Claims, 2 Drawing Figures 4,655,940

CENTRAL COOLANT SYSTEM WITH INTERMITTENT WASTE FLUSHING

BACKGROUND OF THE INVENTION

The present invention relates to an industrial coolant central filtration system, such as those systems utilized to supply an aqueous based, soluble oil coolant to a plurality of separate machining stations to cool the machining stations and to flush machining waste, such as chips, grinding particles, and the like, from the machining station.

Such systems typically include a central filter from which clean, waste-free coolant is supplied by a plurality of high pressure pumps to the machining station; return flumes through which used, waste-bearing coolant returns to the filter for filtration; and flush conduits and nozzles through which coolant is supplied to the flumes at a high transport velocity to move the machining waste through the flumes to the filter.

A typical system of this type is one which circulates about 3,000 gallons per minute of coolant, and one-half or more of the coolant circulation is devoted solely to the flume flushing system. Thus, 1,500 or more gallons per minute are utilized to maintain a flushing transport velocity of between 5 and 10 feet per second merely to prevent the metallic chips and granular particulate from settling in the flumes. Only 1,500 or less gallons per minute of such a system is actually necessary for cooling and flushing the machine tools.

However, the entire flow of 3,000 gallons per minute must be stored, filtered, and continuously recirculated by the multiple pumps, even though relatively light waste loads are generated at the machining stations, particularly where the machining operations are cast iron grinding or honing operations or the like.

In some instances, unfiltered coolant is utilized as the flushing medium, and only filtered coolant is used for flushing the machine tools utilized in the grinding or machining operations. As a result, dual coolant supply header systems are required, as well as separate, constantly operated pumps for the supply of filtered and unfiltered coolant, respectively.

As a result of the prior practices, as above set forth, an unduly large filtration system utilizing multiple pumps in constant operation has been necessary. The large, constant energy requirements of the pumps, the necessary storage and handling facilities for the 3,000 gallons per minute capacity, and the large capital investment necessary, all can be readily appreciated.

BRIEF DESCRIPTION OF THE PRESENT INVENTION

The present invention now proposes that the constantly recirculated coolant be limited to that volume of coolant necessary for the cooling and flushing of the machine tools, and that the constant recirculation of coolant merely to flush the return flumes be eliminated. The machining waste, such as chips, grinding particles, etc., is allowed to accumulate in the return flumes and is only intermittently flushed through the return flumes back to the filtration apparatus. It is only necessary that the flumes be flushed with high velocity coolant flow for a limited period of time, on the order of 1 to 5 minutes, every 2 hours or so in order to flush the machining waste from the return flumes, particularly where the machining waste is low volume grinding waste, i.e., metallic particles and grinding wheel grit. The low volume machining waste is merely allowed to accumulate in the return flumes for 90-99% of the system operating time pending intermediate flushing during the remaining 1-10% of the time.

In a preferred embodiment of the present invention the machining stations are located in groups, and each group of stations is served by a common collection flume or conduit into which the used coolant and machining waste from that group of machines is conveyed to a central return flume which the used coolant flows to the filtration apparatus for recirculation. The machining waste accumulates in the collection flume serving each group of machine stations, and each collection flume is periodically flushed in turn. The collection flume is also simultaneously flushed to move the waste therethrough.

In another embodiment, it is not necessary to group the machines about a collection flume. Rather, additional coolant is injected simultaneously into all of the flumes to flush the previously accumulated waste therefrom.

In either event, the flushing coolant is supplied for only a minimal period of time and at intervals calculated to prevent an excessive build-up of machining waste in any of the flumes.

The additional coolant preferably is supplied to the flumes by coolant introduced into the flumes from the pump (or pumps) normally supplying coolant to the machining stations. During flushing, the output of the pumps(s) is increased or an additional pump or pumps are turned on, and a valve is opened to divert the increased output to the flushing flumes.

The advantage of the present invention will be immediately understood by those skilled in the art, since the proposed system (1) constantly recirculates only that amount of coolant necessary to the cooling and flushing functions of the coolant at the machine tool site, and (2) the flushing volume of coolant is provided only at intermittent, relatively short periods of time to prevent an excessive build-up of machining waste in the flumes, not all of the time as was previously necessary. The savings in energy, filtration unit size, wear and tear on the pumps, etc., are self-evident.

DETAILED DESCRIPTION OF THE PREFERRED EMBODIMENTS

Figure 1:
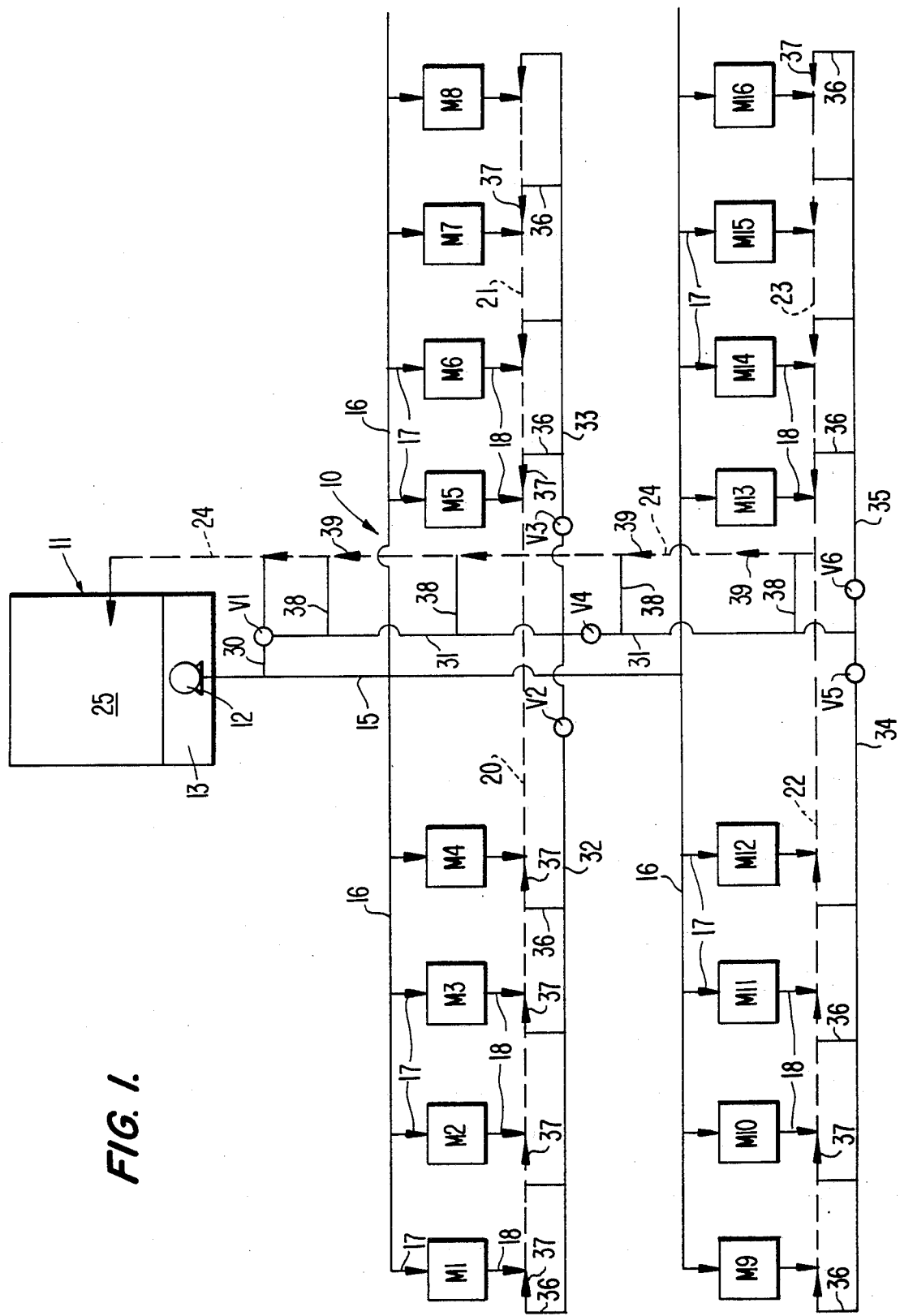
FIG. 1 is a schematic representation of a central coolant system embodying the present invention and in which the return flumes are only periodically flushed.

In that embodiment of the present invention illustrated in FIG. 1 of the drawings, reference numeral 10 refers generally to a central coolant system for supplying a coolant, for example an aqueous based, soluble oil coolant to a plurality of machine tools indicated by reference numerals M1 through M16. The machining stations M1 through M16 may be of any desired type, for example cast iron machining or grinding or honing machines.

The system 10 includes a filtration apparatus 11 which may be of any desired type and typically may include a dirty liquid tank 25 from which dirty liquid is supplied to the filtration apparatus 11 and from which filtered liquid is pumped. An appropriate filter element (not shown) is interposed between the tank 25 and the tank 13. For example, the filter element may be a rotatable drum as shown in U.S. Pat. No. 4,421,645 or a plurality of tubes as shown in U.S. Pat. No. 3,935,105, or a suction screen filter as shown in U.S. Pat. No. 2,861,688, and a precoat filter aid may be used, if desired.

The clean liquid is circulated by a clean liquid pump (or pumps) 12 to the machine tools through a main outlet conduit 15 and branch conduits 16 conveying the clean liquid to the individual machine stations M1–M16 through branch conduits 17. The clean coolant is utilized to cool the machine tool parts of each machine station and to flush machining waste, grinding tool grit and the like from the machine tool in admixture with the coolant.

The dirty coolant, i.e., used coolant admixed with machining waste, flows through coolant discharge lines 18 into a separate collection flume for each group of machining stations. The group of machining stations M1 through M4 discharges dirty coolant through the collection flume or conduit 20, the second group of machining stations M5 through M8 discharges dirty coolant through the collection flume 21, and collection flumes 22 and 23 serve the other two groups of machine tools. The collection conduits 20–23 empty into a single return flume 24 through which dirty coolant is conveyed back to the dirty liquid tank 25 for recirculation.

Thus, the primary coolant recirculation flow path for the apparatus 11 includes the clean coolant tank 13, the pump 12, the coolant supply conduits 15 and 16, the individual machining station supply lines 17, the individual coolant station dirty coolant return lines 18, the collection flumes 20 through 23, the return flume 24, and the dirty coolant tank 25. The coolant is constantly recirculated through this closed flow path during all periods of time at which the system is in operation.

During such constant recirculation of the coolant, machining waste, such as metallic chips, metallic particles, grinding wheel grit, etc. is flushed from the machining stations by the coolant and is conveyed in the dirty coolant into the collection flumes 20–23 and the return flume 24. The average flow through the collection flumes and the return flume may be on the order of about 2 to 3 feet per second or less, which is far less than the 5 to 10 feet per second flow velocity or "transport velocity" which is generally necessary to flush such machining waste through the flume system back to the filtration apparatus. In other words, the normal recirculatory flow in the system is sufficient to move the metallic waste and the grinding wheel grit, for example, through the flumes, and the machining waste will settle in the flume.

Periodically, in accordance with the present invention, additional coolant flow is injected into the flumes to provide coolant flow at the necessary transport velocity i.e., on the order of 5 to 10 feet per second. In the embodiment of FIG. 1, this is accomplished by opening a valve V1 while simultaneously increasing the flow from the pump (or pumps) 12, so that coolant will flow through a bypass line 30 into a flush header 31. This flow through the line 30 is additional to the normal coolant flow through the conduit 15, so that coolant flow to the machining stations is uninterrupted at the normal volume.

Opening the valve V2 directs the flow from the flush header 31 into a flush conduit 32 for the group of machining stations comprising machining stations M1, M2, M3, M4. Coolant flows from the flush conduit 32 through secondary conduits 36 to individual nozzles 37 through which the coolant is injected into the dirty coolant collection flume 20 for the same group of machining stations M1 through M4. The flow from the nozzles 37 flushes the accumulated machining waste through the collection flume 20 into the return flume 24 for flow to the dirty liquid tank 25.

After the accumulated machining waste has been flushed from the collection flume 20, the valve V2 is closed and the valve V3 is opened to introduce flushing liquid from the flush header 31 into the flush conduit 33 serving the next group of machining stations M5 through M8. Once again, the clean coolant flows from the flush conduit 33 through the secondary branch conduits 36 into the individual nozzles 37 to flush accumulated machining waste from the collection flume 31 into the return flume 24 and thence into the dirty liquid tank 25.

Next, the valves V4 and V5 are opened while the valve V1 remains open. All of the remaining valves are closed, so that flushing coolant will flow from the pump (or pumps) 12 through the conduits 30, 31 and 34 to the flush nozzles 37 for the collection flume 22 serving the third group of machine stations M9 through M12. Any waste accumulated in the collection flume 22 is flushed to the flume 24 and the tank 25.

After the accumulated machining waste has been flushed from the collection flume 22, the valve V5 is closed and the valve V6 is opened to direct flushing coolant through the flush conduit 35 and the nozzles 37 into the collection flume 23 serving the fourth group of machining stations M13–M16.

To ensure the flushing of the return flume, branch flush conduits 38 deliver flushing liquid to flush nozzles 39 positioned in the return flume 24.

After the accumulated machining waste has been flushed from all of the collection flumes 20–23, and the return flume 24, all of the valves V1 through V6 are closed, the output of the pump (or pumps) 12 is reduced, and only clean coolant is delivered by the pump (or pumps) 12 to the various machining stations, and no flush coolant is circulated.

The flow of flushing coolant is intermittent and is continued only for a length of time sufficient to flush all of the accumulated machining waste from the collection flumes and the return flume. In a typical central coolant system such as that illustrated in FIG. 1 of the drawings, a single circulatory pump is utilized, perhaps with another pump (not shown) being present on a standby basis although the number of pumps can be varied and one method to increase the flow is to turn on another pump suitably sized. Assuming that the normal machine coolant flow, i.e., with no flushing flow, is 1,500 gallons per minute, and the pump (or pumps) 12 is a 75-horsepower pump capable of pumping 2,000 gallons per minute, a volume of 1,500 gallons per minute is constantly circulated to the machine stations M1–M16 to cool the machine tools and flush machining waste therefrom. This machining waste will accumulate in the collection conduits 20, 21, 22 and 23 during this normal operation at 1,500 gallons per minute. At regular intervals, e.g., every two hours, additional flushing liquid is injected into the flush conduits 30 and 31 by opening the valve V1 and increasing the flow of the pump 12, for example, from 1,500 gallons per minute to 2,000 gallons per minute. The additional 500 gallons per minute flush flow then serves to flush the accumulated machining waste from each of the collection conduits 20-23, in series, and from the return flume 24 by sequentially opening the valves V2-V6, as above explained. Since the flush volume is specific to each individual collection conduit 20-23, the 500 g.p.m. flow is sufficient.

During the flushing, of course, an additional 500 gallons per minute of coolant will be recirculated from the clean tank 13 by the pump 12 through the coolant supply conduits and the flushing flumes back to the dirty tank 25. The level of liquid in the tanks 25 and 13 will drop slightly during the initial stages until the return of the flushed liquid to the dirty tank stabilizes the system to operate at 2,000 gallons per minute. The filter 11 is capable of filtering this 2,000 gallons per minute, particularly for a short, intermittent time.

If the flushing volume of 500 gallons per minute is capable of flushing the accumulated machining waste from each of the collection flumes 20-23 and the return flume 24 within a period of 2 minutes, it will be seen that it is only necessary to operate the pump 12 at its full 2,000 gallon per minute capacity for 8 to 10 minutes every 2 hours. This is a substantial saving in energy costs alone over the normal system of this type which would require the pumping of 3,000 gallons per minute to provide the normal flushing flow of 1,500 gallons per minute. Further, the filter need only be capable of filtering a normal 1,500 gallons per minute with an intermittent filtration capacity of 2,000 gallons per minute. This is a substantially smaller filter than the 3,000 gallon per minute filter which would be required for the normal operation in which 1,500 gallons per minute is constantly circulated for flushing. Additionally, only one pump is required, at a substantial savings in original equipment cost.

Figure 2:
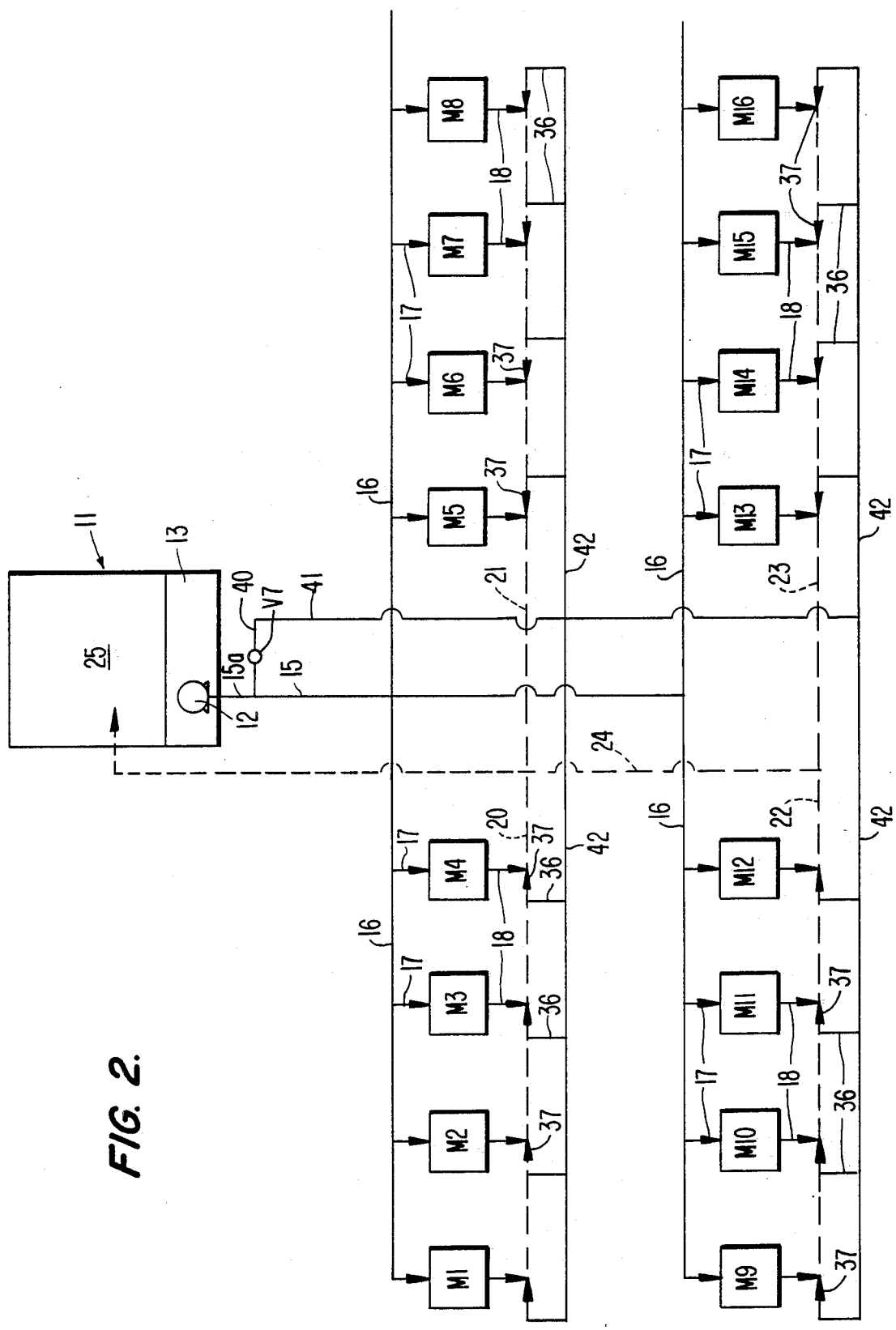
FIG. 2 is a schematic representation to FIG. 1 of a different type of coolant system of the present invention utilizing a pump of increase flow capacity for flushing the return flumes on an intermittent basis or by turning on an additional pump or pumps.

In that embodiment of the invention illustrated in FIG. 2 of the drawings, the apparatus is quite similar to that illustrated in FIG. 1, with certain exceptions which will be detailed. Common parts between the embodiment of FIG. 1 and the embodiment of FIG. 2 are indicated by identical reference numerals.

In the FIG. 2 embodiment, clean liquid is circulated from the clean tank 13 by the pump 12 through the coolant conduit 15 and the branch conduit 16 to the individual machine stations M1-M16. The valve V7 in the line 40 is closed. Dirty coolant from the machine stations flows through the outlet conduits 18 into the collection flumes 20, 21, 22 and 23 into the common return flume 24 for flow back to the dirty tank 15 of the filtration apparatus 11.

Clean flushing coolant is provided by the pump 12 discharging through the clean coolant conduit 15 and open valve V7 in conduit 40 into flush conduit 41. The flush coolant then flows into branch conduits 42 for supplying clean coolant through the individual lines 36 to the flush nozzles 37, and the dirty coolant from the machine stations M1-M16 then flows into the return flume 24.

In the embodiment of FIG. 2, the pump 12 is of substantially greater size and capacity than the pump 12 of the embodiment of FIG. 1, e.g., 2,500 gallons per minute. That portion 15a of the conduit 15 is enlarged to accommodate the flow of an increased volume of clean coolant through both lines 15 and 41. The pump 12 normally operates at a flow capacity of 1,500 gallons per minute, which is sufficient to supply clean liquid to the stations M1-M16. Periodically, the normal flow rate of 1,500 gallons per minute is increased to 2,500 gallons per minute for a limited time. Sufficient flushing liquid is injected from the conduit 41 and through the nozzles 37 at the 2,500 gallon per minute flow rate to simultaneously flush all of the accumulated machining waste from each of the collection flumes 20-23 into the return flume 24 within a period of time, e.g., for about 2-4 minutes every 2-4 hours, to adequately flush all of the accumulated machining waste to the dirty tank 25.

The precise flushing time, coolant volume, and time between consecutive flushes will depend upon various factors, such as the size of the overall system, the volume and type of machining waste, the length and design of the collection and return flumes, etc. This is true for both the version of FIG. 1 and the version of FIG. 2, and all flushing volumes, times and frequency are only illustrative of the invention.

Thus, it will be seen that the present invention provides for the elimination of continuously recirculating flushing flow and substitutes therefor intermittent flush flow with resultant substantial savings in the energy necessary to drive the flush liquid pump. Further, a substantially smaller filtration apparatus is required to filter the normal machine station coolant requirements while being capable of filtration of additional flush flow during the intermittent flushing operation. Further, the present invention can be adapted to either existing central coolant systems or to newly constructed systems to obtain these advantages.

An acceptable variation in the above description would be to utilize smaller multiple pumps and increase and decrease the flow by turning an additional pump (or pumps) on and off at appropriate times.

It is claimed:

1. In a method of operating a central coolant system for a plurality of machining stations at which machining waste is generated, the system including a pump receiving clean coolant from a filtration apparatus and supplying clean coolant under pressure to the respective machining stations, and return flumes for the flow of dirty coolant from the machining stations to the filtration apparatus, the improvement comprising the steps of:
    (1) continuously supplying clean coolant from said pump to the machining stations for flow back to the filtration apparatus at a pump flow rate insufficient to flush machining waste from said stations through the return flumes, the machining waste accumulating in the flumes; and
    (2) intermittently increasing the pump flow rate to flush the accumulated machining waste therefrom and to flow the waste through the flumes to the filtration apparatus.

2. In a method of operating a central coolant system for a plurality of machining stations at which machining waste is generated, the system including pump means for supplying clean coolant from a filtration apparatus to the respective stations, the stations being arranged in a plurality of groups and each group of stations having an individual collection flume through which dirty coolant flows to a common return flume for return to the filtration apparatus, the improvement comprising the steps of:
    (1) continuously supplying coolant from said pump means to the machining stations for flow back to the filtration apparatus at a flow rate insufficient to flush machining waste from said stations through the flumes, the machining waste accumulating in the flumes; and (2) periodically flowing additional coolant from the pump means to the collection flumes of each group of machining stations, in turn, to flush any accumulated machining waste from the collection flume for that group for flow through the common return flume to the filtration apparatus.

3. In a method of operating a central coolant system for a plurality of machining stations at which machining waste is generated, the system including pump means for supplying coolant from a filtration apparatus to the respective machining stations and flumes through which used coolant is returned to the filtration apparatus from the individual stations, the improvement comprising the steps of:

(1) continuously supplying coolant from said pump means to the machining stations for flow back to the filtration apparatus at a flow rate insufficient to flush machining waste from said stations through the flumes, the machining waste accumulating in the flumes;

(2) periodically flowing additional coolant from the pump means directly into the flumes of less than all of the machining stations to flush the accumulated machining waste therein to the filtration apparatus; and (3) repeating step (2) for the return flumes of the remaining machining stations until all of the flumes are free of accumulated waste;

4. In a method of operating a central coolant system for a plurality of machining stations at which machining waste is generated and returned through flumes to a filtration apparatus, the improvement comprising the steps of:

(1) continuously recirculating coolant to and from the machining stations at a pump flow rate so low as to permit the accumulation of machining waste in the flumes; and (2) periodically increasing the pump flow rate for a period of time sufficient to flush the accumulated machining waste from the flumes.

5. In a method of operating a central coolant system having a central filtration station for a plurality of machining stations at which machining waste is generated, the improvement comprising the steps of:

(1) continuously pumping coolant to recirculate coolant in the system and to supply clean coolant to the respective stations, the stations being subdivided into groups and each group of stations having an individual collection flume through which dirty coolant flows to a common return flume for recirculation;

(2) during the performance of step (1), accumulating the machining waste in the collection flumes; and (3) periodically and sequentially injecting additional coolant directly into each of the collection flumes in turn to flush any accumulated machining waste therefrom and into the common return flume.

6. In a method of operating a central coolant system for a plurality of machining stations at which machining waste is generated, the system including a pump for supplying clean coolant to the respective machining stations, and return flumes for the flow of dirty coolant from the machining stations to a filtration apparatus prior to recirculation from the pump to the stations, the improvement comprising the steps of:

(1) normally recirculating coolant at a pump flow rate sufficient to supply the machine stations, but insufficient to flush machining waste through the return flumes; and (2) periodically and for a period of time not exceeding 10% of the total system operating time increasing the pump flow rate to inject additional coolant into the return flumes to flush any accumulated machining waste therefrom.

7. In a method of operating a central coolant system for a plurality of machining stations at which machining waste is generated, the system including a pump operable at a first flow rate for continuously recirculating clean coolant from a filtration apparatus to the respective stations and back to the filtration apparatus through return flumes), the improvement comprising the steps of:

(1) accumulating the machining waste from each station in the flumes when the pump is operating at said first flow rate; and (2) periodically increasing the flow rate of said pump above said first flow rate to flush any accumulated machining waste from the flumes.

8. In a central coolant system for a plurality of machining stations at which machining waste is generated, the system including a filtration apparatus for supplying clean coolant to the respective stations, the dirty coolant flowing from the stations through flumes for return to the filtration apparatus, the improvements comprising:

(1) at least one pump for continuously supplying coolant to the machining stations for flow through the flumes at a flow rate insufficient to flush machining waste from said stations through the return flumes, the machining waste accumulating in the flumes; and (2) means for periodically increasing the output of said at least one pump to inject additional coolant into the flumes at a flow rate sufficient to flush any accumulated machining waste to the filtration apparatus.

9. In a central coolant system for a plurality of machining stations at which machining waste is generated, the system including a filtration apparatus for supplying clean coolant to the respective machining stations, the stations being arranged in groups and each group having an individual collection flume from which dirty coolant flows to a common return flume for return to the filtration apparatus, the improvements comprising: a pump (a) operable at a first flow rate for continuously supplying coolant to the machining stations for flow back to the filtration apparatus, the first flow rate being insufficient to flush machining waste from said stations through the flumes and the machining waste accumulating in the flumes; and (b) operable for less than about 10% of the time at a second flow rate greater than said first flow rate directly into the individual collection flumes of the machining stations in sequence to flush the accumulated machining waste therefrom; and sequentially actuatable valve means for directing the additional coolant from the pump into the individual collection flumes.

* * * * *